United States Patent Office 3,493,592
Patented Feb. 3, 1970

3,493,592
PREPARATION OF DIALKYLTINS AND
DIALKYLTIN OXIDES
Hymin Shapiro and Paul Kobetz, Baton Rouge, La., assignors to Ethyl Corporation, New York, N.Y., a corporation of Virginia
No Drawing. Filed Jan. 15, 1968, Ser. No. 697,575
Int. Cl. C07f 7/22
U.S. Cl. 260—429.7
12 Claims

ABSTRACT OF THE DISCLOSURE

Dialkyltin compounds are prepared by reaction of anhydrous stannous chloride with an aluminum trialkyl in a hydrocarbon solvent in the presence of an alkali metal fluoride to complex the aluminum chloride by-product. The dialkyltin products may be air oxidized to dialkyltin oxides which are useful as biocides and as intermediates for thermal stabilizers for polyvinyl chloride.

---

This invention relates to the manufacture of dialkyltin compounds. More specifically, it relates to a novel and efficient method for the preparation of tin dialkyls and dialkyltin oxides.

In British Patent No. 768,765, it is suggested that alkylaluminum compounds may be reacted with various metal and metalloid fluorides to make the corresponding alkyl derivatives of the metal or metalloid in question. The disclosure does not suggest the feasibility of using any other halide salt, but rather that the reaction is quite specific in requiring the use of a fluoride salt.

In the manufacture of dialkyltin compounds, it would be very desirable to be able to conduct such a reaction with stannous chloride because this compound is readily prepared and is relatively inexpensive as compared with stannous fluoride. However, the prior art fully appreciates the difficulty of reacting stannous chloride with a trialkylaluminum compound, especially when attempting to produce the corresponding dialkyltin compound in good yield and high purity.

For instance, in Comparative Example A of U.S. Patent No. 3,095,433, triethylaluminum is added to a suspension of stannous chloride in heptane. Heat is evolved, and the mixture turns red-brown in color. Hydrolysis of the product with water leads to a complex mixture of solid, aqueous and organic fractions. The solid product is highly impure, principally inorganic in nature, and difficult to identify.

It has now been discovered that stannous chloride can indeed be reacted with aluminum trialkyls to produce dialkyltin compounds in good yield and high purity in hydrocarbon solvents such as xylene, when an alkali metal fluoride is also present as a complexing agent for the aluminum chloride by-product of the reaction.

Because of the susceptibility to oxidation of the reactants and of the principal product of the above reaction, care should be taken to avoid contact of the reacting mixture with air or other oxidizing gas. The dialkyltin product can be oxidized, however, with or without prior separation, to the corresponding dialkyltin oxide by means of air or other oxidizing agent, as indicated below.

Accordingly, it is an object of the present invention to provide a simple and efficient process for the preparation of both tin dialkyls and dialkyltin oxides. Another object is to provide a method for the preparation of dialkyltin oxides which is simpler and which involves fewer operations than previously known processes. Still another object is to provide a method for the preparation of dialkyltin compounds which avoids the above-mentioned difficulties. Other objects will appear hereinafter.

Pursuant to this invention, tin dialkyls are efficiently prepared by reacting an aluminum trialkyl with anhydrous stannous chloride in a hydrocarbon solvent and in the presence of an alkali metal fluoride complexing agent. For best results, the solvent should be an aromatic hydrocarbon. The dialkyltin product is then recovered from the reaction mixture or, alternatively, with or without separation, is treated with atmospheric oxygen or other suitable oxidizing agent to yield the corresponding dialkyltin oxide. This process, therefore, represents an embodiment of the present invention. Other embodiments will appear hereinafter.

The aluminum alkyls employed in the process of this invention may contain from 1–40 or more carbon atoms in each alkyl group but those wherein each alkyl group contains from 2 to about 8 carbon atoms react rapidly and smoothly and are therefore preferred. Tri-n-butylaluminum, because of its ease of preparation, is particularly preferred.

Any of a wide variety of oxidizing agents can be employed as reactants in the second or oxidizing stage of the process of this invention. These oxidizing agents may include, among others, air, gaseous oxygen, hydrogen peroxide, alkali metal peroxides, alkaline earth metal peroxides and organic peroxides. Of these, air has been found to be an effective reactant and, because of its low cost and availability, is preferred.

As compared with earlier processes, the process of the present invention offers a number of advantages. It is inherently economical of labor and of materials because the aluminum trialkyl is completely consumed, the reaction being driven essentially to completion by the formation of the alkali metal fluoride complex of the aluminum chloride by-product. This complex formation affords an easy separation of by-products from the reaction mixture.

The invention will be more fully understood by reference to the following set of illustrative examples in which, unless otherwise specified, all parts and percentages are by weight.

In the experiments described below, the reactor consisted of a 250-ml. flask fitted with a reflux condenser and a magnetic stirrer with stirring bar. All metathesis reactions and associated operations were carried out under a nitrogen blanket. In a typical experiment, 25 ml. of 92 percent tri-n-butylaluminum (17.4 g.) were added to 25 g. of stannous chloride in a solvent or co-solvent. Heat, when used, was applied by means of an oil bath.

EXAMPLE I

The reactor was charged successively with 50 ml. of toluene, 8 g. of sodium fluoride and 25 ml. of tributylaluminum. Twenty-five grams of stannous chloride was then added slowly. The reaction mixture turned brown in color and became so hot that some toluene boiled out. After one-half hour, the reaction subsided; the reaction mixture was heated to reflux for 1 hour and filtered. The residue was washed on the filter with a small amount of toluene and the washings were combined with the filtrate. The filtrate was then washed with 100 ml. of 10 percent caustic and the phases were separated. The alkyl phase was air-oxidized for 1 hour, during which its color became considerably lighter. The oxidation was filtered. The residue, after washing and drying, weighed 23.0 g. The filtrate, upon vacuum distillation, yielded another 2 g. of product. The yield of dibutyltin oxide was 77 percent by weight. Analysis showed 49.8 weight percent of tin, 0.40 weight percent of aluminum and 0.47 weight percent of chlorine, indicating that the dibutyltin oxide product contains small amounts of stannous chloride, aluminum chloride and tributylaluminum.

The above example illustrates the use of the complexing effect of sodium fluoride to separate the aluminum chloride by-product of the metathesis reaction.

In the above example, the metathesis and oxidation reactions were carried out successively without separation of the metathesis product. The dibutyltin intermediate can, however, very readily be isolated by fractionation of the alkyl phase by distillation, extraction with an immiscible solvent, or other known means.

When the sodium fluoride of the above example is replaced by lithium fluoride, potassium fluoride, rubidium fluoride or cesium fluoride, similar results are obtained. The air employed for oxidation in Example I can be replaced by pure oxygen or by oxygen diluted with an inert gas such as nitrogen, helium, neon, argon, krypton or xenon, or with a mixture of such inert gases. Results similar to those of Example I are then obtained.

When the procedure of Example I is repeated, except that the oxidation by means of air is replaced by oxidation with hydrogen peroxide, sodium peroxide or benzoyl peroxide, similar results are obtained.

Comparative example

The reactor was charged with 50 ml. of heptane, 25 ml. of tributylaluminum and 8.0 g. of sodium chloride. Twenty-five grams of stannous chloride were added slowly over a period of one-half hour. The temperature of the reaction mixture rose to about 80° C. This temperature was maintained for 4 hours, during which period the solution became deep brown in color. The solution was filtered, the residue on the filter was washed with heptane and the washings were combined with the filtrate. The filtrate was oxidized by bubbling air through it for one-half hour, at the end of which time it was light in color. The mixture was filtered; the washed and dried residue weighed 5.1 g., a yield of 15.6 percent.

The above results show clearly that sodium chloride is not a satisfactory substitute for sodium fluoride in the metathesis reaction. In an experiment similar to the above, all of the sodium chloride was recovered by filtration after the reaction. It had clearly taken no part in the reaction, because sodium chloride does not complex to a significant extent with trialkylaluminum.

The trialkylaluminum reactant of this invention may contain from 1 to 40 or more carbon atoms per alkyl group. For reasons of availability and ease of preparation, those containing from 1 to about 8 carbon atoms per alkyl group are preferred. These reactants are exemplified by trimethylaluminum, tri-n-propylaluminum, tri-isoamylaluminum, tri-n-octylaluminum, tri-n-decylaluminum, tri-n-dodecylaluminum, tri-cetylaluminum, tri-eicosylaluminum, tri-n-triacontylaluminum and tri-n-tetracontylaluminum. Mixed aluminum alkyls containing 2 or more different alkyl radicals can also be used.

The oxidizing agents of this invention include air, pure gaseous oxygen, oxygen diluted with such inert gases as nitrogen, helium, neon, argon, krypton and xenon, hydrogen peroxide, lithium peroxide, sodium peroxide, potassium peroxide, rubidium peroxide, cesium peroxide, magnesium peroxide, calcium peroxide, strontium peroxide, barium peroxide and organic peroxides such as benzoyl peroxide, dibutyl peroxide, acetyl peroxide and tetrahydrofuran hydroperoxide.

In the reaction of the trialkylaluminum with the tin halide, the relative proportions of the reactants may vary from a 100 percent or greater excess of the former to a 100 percent or greater excess of the latter. Approximately stoichiometric proportions are normally preferred since the use of such proportions simplifies recovery problems. In the oxidation step, a large excess, of the order of 100 percent, of the oxidizing agent is normally employed since such excess favors rapid completion of the oxidation reaction.

Reaction temperatures in the present process are not at all critical. In fact, any temperature between −20° C. or below and the reflux temperature of the solvent employed is satisfactory; for ease of operation, temperatures in the neighborhood of ambient temperature, for example, from 15° to 50° C. are preferred.

The pressures herein may range from atmospheric or below to 10 atmospheres or above. For simplicity of operation, atmospheric pressure is preferred. In any case, the pressure-producing atmosphere should be inert with respect to reactants and products. Suitable atmospheres include saturated aliphatic hydrocarbons which are gaseous under the reaction conditions, carbon monoxide, hydrogen, nitrogen, helium, neon, argon, krypton, xenon and mixtures of two or more of the foregoing.

A variety of hydrocarbon solvents may be employed in the process of the present invention. Specifically, aromatic hydrocarbons, liquid under the reaction conditions, constitute preferred solvents. Suitable aromatic hydrocarbons include benzene, toluene, ortho, meta and para xylenes, mesitylene, durene, prehnitene, and alpha and beta methyl naphthalenes. Other aromatic hydrocarbons containing up to about 12 carbon atoms and mixtures thereof are also satisfactory. In some cases, other types of hydrocarbons may be used, for example, cycloparaffins such as methylcyclohexane, decahydronaphthalene, and the like. Also, hydrocarbon mixtures containing at least about 20 volume percent of aromatics (e.g., commercially available gasoline fractions, etc.) may be employed. Toluene is preferred because of its economy and accessibility.

The order of addition of the reactants is not important, i.e., the organoaluminum compound can be added to the tin compound or conversely. However, since the organoaluminum compound is in liquid phase and the tin compound is a solid, the addition of the former to the latter can be more readily controlled and is therefore preferred. The reaction times required for the metathesis and oxidation steps vary widely depending upon the other reaction conditions employed. In general, the period for each of the steps can vary from 5 minutes or less to 6 hours or more. Other things being equal, the introduction of alkyl substituents into or the lengthening of alkyl chains in the aluminum alkyl reactants tends to reduce the reaction rates and increase the required reaction time. The permissible rate of reactant addition is a function of the reflux capacity of the reactor and is limited by that capacity. Within that limit any desired rate of addition may be employed.

The products of this invention are of utility in a number of applications. They are effective rodenticides and insecticides and are useful intermediates in the preparation of thermal stabilizers for polyvinyl chloride. (See, for example, S. L. Burt, U.S. 2,489,518, Nov. 29, 1949 and U.S. 2,583,084, Jan. 22, 1952.)

What is claimed is:

1. The process for the preparation of a dialkyltin which comprises reacting an aluminum trialkyl with substantially anhydrous stannous chloride, in an aromatic hydrocarbon solvent liquid under the reaction conditions, and in the presence of an alkali metal fluoride, and recovering the dialkyltin product so formed.

2. The process of claim 1 wherein each alkyl group of said aluminum trialkyl contains from 1 to about 8 carbon atoms.

3. The process of claim 1 wherein said aluminum trialkyl is tri-n-butyl aluminum.

4. The process of claim 1 wherein said hydrocarbon solvent is toluene.

5. The process of claim 1 wherein said alkali metal fluoride is sodium fluoride.

6. The process for the preparation of a dialkyltin oxide which comprises reacting an aluminum trialkyl with substantially anhydrous' stannous chloride in an aromatic hydrocarbon solvent liquid under the reaction conditions and in the presence of an alkali metal fluoride, oxidizing the dialkyltin product so formed with an oxidizing agent selected from the group consisting of air, oxygen, hydrogen peroxide, alkali metal peroxides, alkaline earth metal peroxides and organic peroxides, and recovering the dialkyltin oxide so formed.

7. The process of claim 6 wherein each alkyl group of said aluminum trialkyl contains from 1 to about 8 carbon atoms.

8. The process of claim 6 wherein said aluminum trialkyl is tri-n-butylaluminum.

9. The process of claim 6 wherein said hydrocarbon solvent is toluene.

10. The process of claim 6 wherein said alkali metal fluoride is sodium fluoride.

11. The process of claim 6 wherein said oxidizing agent is air.

12. The process of claim 6 wherein said aluminum trialkyl is tri-n-butylaluminum, said solvent is toluene, said alkali metal fluoride is sodium fluoride, and said oxidizing agent is air.

References Cited

UNITED STATES PATENTS

| | | | |
|---|---|---|---|
| 3,016,397 | 1/1962 | Walde | 260—429.7 X |
| 3,027,393 | 3/1962 | Jenkner et al. | 260—429.7 |
| 3,061,647 | 10/1962 | Jenkner | 260—429.7 X |
| 3,072,697 | 1/1963 | Jenkner | 260—429.7 X |
| 3,095,433 | 6/1963 | Mangham | 260—429.7 |
| 3,103,526 | 9/1963 | Jenkner | 260—429.7 X |
| 3,254,009 | 5/1966 | Ziegler et al. | 260—429.7 X |
| 3,287,386 | 11/1966 | Neuman | 260—429.7 |
| 3,288,828 | 11/1966 | Wartik et al. | 260—429.7 X |

DELBERT E. GANTZ, Primary Examiner